United States Patent Office 2,894,368
Patented July 14, 1959

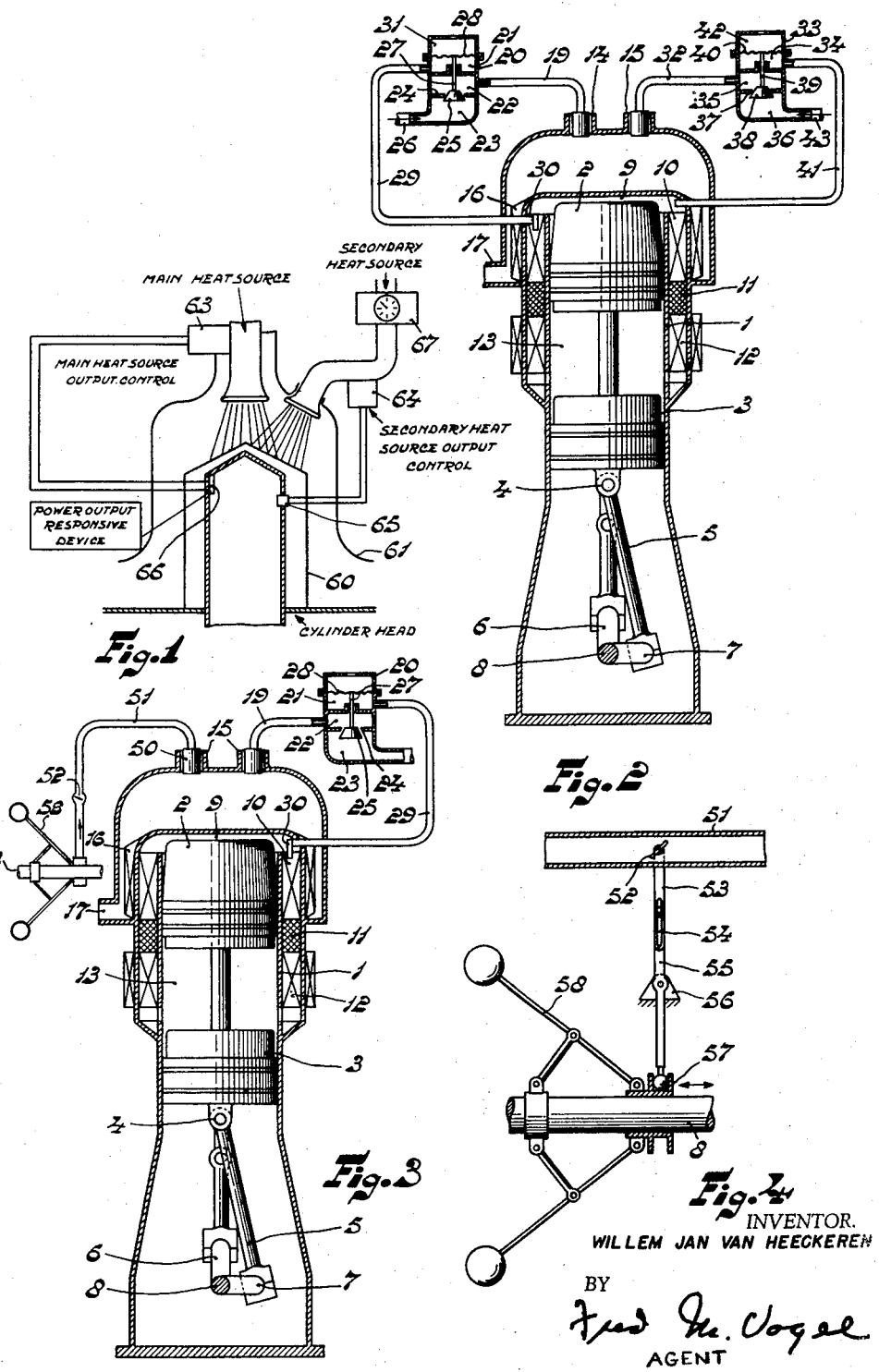

2,894,368

HOT-GAS ENGINE COMPRISING MORE THAN ONE DEVICE FOR THE SUPPLY OF HEAT

Willem Jan van Heeckeren, Delft, Netherlands, assignor, by mesne assignments, to North American Philips Company, Inc., New York, N.Y., a corporation of Delaware Application March 19, 1953, Serial No. 343,344

Claims priority, application Netherlands February 6, 1946

5 Claims. (Cl. 60—24)

This invention relates to hot-gas engines comprising more than one device for the supply of heat, one or more of these devices being independent and one or more being dependent on the operating condition of the engine. Such a situation occurs, for example, in hot-air piston engines, in which the fuel pump for the supply of paraffine or any other fuel is driven by the engine while there is, in addition, a separate burner serving solely to supply the heat required for starting the engine.

This application is a continuation-in-part of my co-pending application Serial No. 691,615 filed August 19, 1946, now abandoned.

The term "hot-gas engine" is to be understood to mean a caloric engine in which a medium of constant caloric composition, which is invariably in the gaseous phase, traverses a thermodynamic cycle, substantially reversible, in two chambers which are in continuous communication with each other and have different temperatures, in one of the said chambers substantially an expansion and in the other substantially a compression of the medium occurs. The aforesaid engine comprises means for carrying off and replenishing respectively the amount of heat produced and lost during the compression and the expansion respectively.

The presence of devices supplying heat independently of the operating condition of the engine has the drawback that the part of the engine which is to be heated may be overheated with all the disadvantageous consequences involved. Such may more particularly be the case when for the purpose of obtaining a short heating-up time there is arranged a strong burner giving off much heat. In this case a slight negligence of the operating staff may lead to serious damage to the engine.

According to the invention, a hot-gas engine comprising more than one device for the supply of heat, one or more of which are independent of the operating condition of the engine, is constructed to include means by which the devices which are independent of the operating condition of the engine are controlled to prevent them from overheating the engine.

In one advantageous embodiment of the invention, the amount of heat supplied per unit of time by the device which is independent of the operating position is such that this amount of heat and the losses of heat of the engine during the same time at the operating temperature balance each other.

In a further advantageous embodiment of the invention the device which is independent of the operating condition of the engine may only be supplied with such an amount of fuel that the operating temperature, is just attained.

One of the means which, according to the invention, is present to prevent the heat-supply device which is independent of the operating condition of the engine from overheating the engine may be constituted by a clockwork making the device inoperative after a lapse of a definite period of time.

It is also possible, likewise according to an advantageous embodiment of the invention, that the means referred to in the previous paragraph is a means which reacts at a definite temperature and which switches off the device which is independent of the operating position of the engine when this temperature is reached.

A further embodiment of the present invention includes a centrifugal governor means which actuates one of the separate control means and is responsive to the variations in the number of revolutions of the crank shaft of the present hot-gas engine.

The above and other features, objects and advantages of the present invention will be fully understood from the following description considered in connection with the accompanying illustrative drawings in which:

Fig. 1 shows a diagrammatic representation of a form of apparatus embodying the invention;

Fig. 2 is a longitudinal sectional view shown partly in elevation of the apparatus shown in Fig. 1;

Fig. 3 is a view similar to Fig. 2 showing another embodiment of the present invention;

Fig. 4 is an enlarged view partly in section and partly in elevation showing the means in Fig. 3 connected to the crank-shaft for regulating the fuel supply to one of the burners.

Referring more particularly to Figure 1 of the drawing, a cylinder head of a hot-gas engine is shown with jacket elements 60 and 61 for confining hot combustion gases in heat exchange relationship with the said cylinder head. The interior of the jacket element 61 is supplied hot combustion gases by means of two separate heat sources, or, as shown in the drawing, a main heat source and a secondary heat source. The outputs of the main and secondary heat sources are controlled by controls 63 and 64, respectively. Control 64 is connected to be actuated by temperature responsive element 65 located to be affected by the heat of inner jacket element 60. Control 63, on the other hand is connected to be actuated by engine operating condition responsive element 66 here shown diagrammatically to be a pressure responsive device exposed to the pressure inside the cylinder head of the engine. Such pressure is, of course, a function of the operation condition and power output of a hot-gas engine.

A further means to prevent the secondary heat source which is operated independently from the operating conditions of the engine from overheating is a clock device, shown at 67, which makes the device inoperative after lapse of a definite period of time.

The hot gas reciprocating apparatus shown in Fig. 2 is a hot gas reciprocating engine of the so called displacer type. The displacer 2 and the piston 3 are adapted reciprocate in a cylinder 1. The displacer and the piston are coupled by way of driven mechanisms 4 and 5 to cranks 6 and 7 of a common crank shaft 8. The cranks 6 and 7 in this engine are at an angle of 90 degrees to one another. A space 9 above the displacer 2 is the hot space of the engine and communicates by way of a heater 10, a regenerator 11 and a cooler 12 with the space 13 between the displacer 2 and the piston 3. The latter space is the so called cold space of the engine. The heater 10 has supplied to it thermal energy by the use of the burners 14 and 15. The combustion gases flow about fins 16 of the heater leaving the engine through an outlet tube 17. Heat is extracted from the cooler, for instance with the use of a water cooling. However, in the engine shown in the drawing, cooling fins 18 are provided which permits cooling by means of air. The burner 14 is provided with a supply pipe 19, which is connected to a regulating device 20 by which the amount of fuel delivered to the burner is regulated. The device 20 consists of three spaces 21, 22 and 23, two of them i.e. the spaces 22 and 23 are in connection to each other through an opening 24, which can be closed or diminished by the valve 25. The space 23 is connected to the pipe 26 through which fuel is supplied. The valve 25 is provided with a valve stem 27 which is connected to a membrane 28. The space 21 beneath the membrane 28 is connected to the pipe 29 of a thermostatic device 30. The pipe 29 and the space 21 may be filled with a liquid which expands if the temperature of the thermostatic device is raised. The space 31 above the membrane 28 is in open connection with the surrounding air. With the thermostatic device 30 the temperature of the working medium in the working space of the engine is measured.

The burner 15 is provided with a fuel supply pipe 32, which is connected to a regulating device 33 corresponding to the regulating device 20 set forth hereinabove. The device 33 is provided with three spaces 34, 35 and 36, two of which i.e. 35 and 36 being in open connection through the opening 37, which may be diminished or closed by the valve 38. The space 36 is connected to the fuel supply pipe 43. The valve 38 is provided with a valve stem 39 which is secured to the membrane 40. The space 34 beneath the membrane 40 is connected to the pipe 41 having a small diameter and which opens out in the working space of the engine. So in the space 34 the medium pressure which occurs during one cycle is present. The space 42 above the membrane 40 is in open connection to the atmosphere.

If in the device the temperature in the working space is raised the liquid in the thermostatic device 30 is raised so that the pressure in the space 21 of the regulating device 20 is increased. Due to this fact the valve 25 is moved in an upward direction and the supply of fuel to the burner 14 is diminished. If, however the medium pressure in the working space is raised, the pressure in space 34 raises also due to which the valve 37 is moved in an upward direction whereafter the fuel supply to the burner 15 is diminished. Accordingly, if the temperature in the working space is diminished the fuel supply to the burner 14 is increased and if the pressure in the working space is diminished the fuel supply to the burner 15 is increased.

In the construction according to Figs. 3 and 4 wherein Fig. 4 is on a larger scale the fuel supply to one of the burners is regulated by the number of revolutions of the crank shaft.

In the hot gas engine shown in Fig. 3 parts corresponding to parts described in Fig. 2 are numbered with the same figures. Burner 15 is regulated in the same way as burner 15 of Fig. 1 and is provided with a supply line 19 in which the same regulating device as in Fig. 1 is present. The hot gas engine is, however, provided with a second burner 50, which is provided with a fuel supply pipe 51. In this fuel supply pipe a valve 52 is present. The valve 52 can be opened and closed by a governor referred to generally by the numeral 70 and shown in detail in Fig. 4 working upon the crank shaft 8. Such a governor is shown on a larger scale in Fig. 4. In this figure the valve 52 is provided with a lever 53 having a sleeve 54 in which the lever 55 which can pivot around point 56 is connected. The lever 55 is pivotally connected to the bushing 57 of the centrifugal governor 58 which is placed upon the shaft 8. If the number of revolutions of the crank shaft 8 is increased the bushing 57 is moved to the left due to which the lever 55 pivots around point 56 and the lever 53 turns to the right and the valve 52 diminishes the passage of the fuel in supply pipe 51 as a result of which less fuel is supplied to the burner 50. If the number of revolutions of the crank shaft 8 diminishes the bushing 57 is moved to the right, due to which the valve 52 is opened and more fuel is supplied to the burner 50. In the same way as is described in Fig. 1 an increase of the temperature of the working space causes a decrease of fuel supply to the burner 14 while a decrease in temperature in the working space causes an increase of the amount of fuel supplied to the burner 14.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A hot-gas engine comprising: a cylinder, a heater head operatively associated with said cylinder, a plurality of separate means for supplying heat to said heater head, separate control means for each of said heat supply means, means responsive to the pressure inside the cylinder of the engine for actuating one of said separate control means, and means solely responsive to the temperature obtained in said cylinder for actuating another of said separate control means, both said means responsive to the pressure inside the cylinder of the engine and the means responsive to the temperature attained in said cylinder preventing said engine from being overheated.

2. A hot-gas engine comprising: a cylinder, a heater head operatively associated with said cylinder, first means for supplying heat to said heater head, second means for supplying heat to said heater head, separate control means for each of said heat supply means, said control means for said second heat supply means, when actuated, causing said second heat supply means to provide heat in amounts insufficient to raise the temperature of said engine above operating temperature, means responsive to the pressure inside the cylinder of said engine for actuating said one of said separate control means operatively associated with said first heat supply means, and means solely responsive to the temperature obtained in said cylinder for actuating said other of said separate control means, both said means responsive to the engine and the means responsive to the temperature attained in said cylinder preventing said engine from being overheated.

3. A hot-gas engine comprising: a cylinder, a heater head operatively associated with said cylinder, first means for supplying heat to said heater head, second means for supplying heat to said heater head, control means for said first heat supply means, means responsive to the pressure inside the cylinder of said engine for actuating said control means operatively associated with said first heat supply means, and separate clock work means for rendering said second heat supply means inoperative after a predetermined period of operation.

4. A hot-gas engine comprising: a cylinder, a heater head operatively associated with said cylinder, first burner means for supplying heat to said heater head, second burner means for supplying heat to said heater head, separate control means to regulate the amount of heat supplied by each burner, one of said control means comprising first means responsive to the pressure within the engine cylinder to regulate the amount of heat supplied to the first burner means, and the other of said control means comprising means for regulating the amount of heat supplied by the second burner, the amount of heat only being sufficient to raise the temperature of the engine to a certain temperature, said means responsive to pressure within the engine cylinder and said means for regulating the amount of heat supplied by the second burner preventing said engine from being overheated.

5. A hot-gas engine comprising: a cylinder, a piston in said cylinder, a crankshaft, a connecting rod connecting the piston to said crankshaft, a heater head operatively associated with said cylinder, a plurality of separate means for supplying heat to said heater head, separate control means for each of said heat supply means, means responsive to the number of revolutions of said crankshaft for actuating one of said separate control means, and means solely responsive to the temperature obtained in said cylinder for actuating another of said separate control means, said means responsive to the number of revolutions of said crankshaft for actuating one of said separate control means including a governor mounted on said crankshaft and a pivoting lever operatively connected to said governor.

References Cited in the file of this patent

UNITED STATES PATENTS

| | | |
|---|---|---|
| 1,273,466 | Doble | July 23, 1918 |
| 2,019,766 | Peterson | Nov. 5, 1935 |
| 2,095,991 | Lysholm | Oct. 19, 1937 |
| 2,296,256 | Bloom | Sept. 22, 1942 |
| 2,318,801 | Ray | May 11, 1943 |
| 2,390,806 | Nagel | Dec. 11, 1945 |
| 2,405,573 | Frisch | Aug. 13, 1946 |
| 2,518,996 | Peckham | Aug. 15, 1950 |
| 2,564,097 | Rinia et al. | Aug. 14, 1951 |
| 2,581,276 | Mock | Jan. 1, 1952 |
| 2,682,922 | Nelson et al. | July 6, 1954 |